(12) United States Patent
Kato et al.

(10) Patent No.: US 9,857,662 B2
(45) Date of Patent: Jan. 2, 2018

(54) OPTICAL FREQUENCY SHIFT DEVICE AND METHOD

(71) Applicant: FUJITSU LIMITED, Kawasaki-shi, Kanagawa (JP)

(72) Inventors: Tomoyuki Kato, Yokohama (JP); Shigeki Watanabe, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/453,047

(22) Filed: Mar. 8, 2017

(65) Prior Publication Data
US 2017/0307957 A1   Oct. 26, 2017

(30) Foreign Application Priority Data
Apr. 20, 2016   (JP) .................. 2016-084807

(51) Int. Cl.
| | |
|---|---|
| G02F 1/35 | (2006.01) |
| H04B 10/532 | (2013.01) |
| H04B 10/548 | (2013.01) |
| H04J 14/02 | (2006.01) |

(52) U.S. Cl.
CPC ............ G02F 1/353 (2013.01); G02F 1/3544 (2013.01); H04B 10/532 (2013.01); H04B 10/548 (2013.01); H04J 14/0212 (2013.01); G02F 2001/3546 (2013.01); G02F 2203/07 (2013.01)

(58) Field of Classification Search
CPC ............ G02F 1/353; G02F 1/3544; G02F 2001/3546; G02F 2203/07; H04B 10/532; H04B 10/548; H04J 14/0212
See application file for complete search history.

(56) References Cited

U.S. PATENT DOCUMENTS

| | | | |
|---|---|---|---|
| 2005/0180682 A1* | 8/2005 | Griffin ............ | H04B 10/25137 385/16 |
| 2016/0285582 A1* | 9/2016 | Kato .................. | H04J 14/0298 |
| 2017/0026114 A1* | 1/2017 | Sugitani ........... | H04B 10/07953 |

FOREIGN PATENT DOCUMENTS

| | | |
|---|---|---|
| JP | 4-45428 | 2/1992 |
| JP | 2004-93583 | 3/2004 |

* cited by examiner

*Primary Examiner* — Shi K Li
*Assistant Examiner* — Mina Shalaby
(74) *Attorney, Agent, or Firm* — Staas & Halsey LLP

(57) ABSTRACT

An optical-frequency shift device to shift a first optical-signal of a first optical-frequency to a second optical-signal of a second optical-frequency, including a splitter to split the first optical-signal to optical-signals of first and second polarizations, orthogonal each other, a generator to generate first and fourth controlled-light of the first polarization, and second and third controlled-light of the second polarization, each of frequency differences between the first and second controlled-light and between the third and fourth controlled-light having a spacing equal to a difference between the first and second optical-frequencies, a nonlinear optical-medium in which idler light of the second and first polarization are created by causing cross phase modulation of the optical-signals of the first and second polarizations, the first and third controlled-light, and the second and fourth controlled-light, respectively, and an optical-combiner to combine the idler light of the second and first polarization.

5 Claims, 10 Drawing Sheets

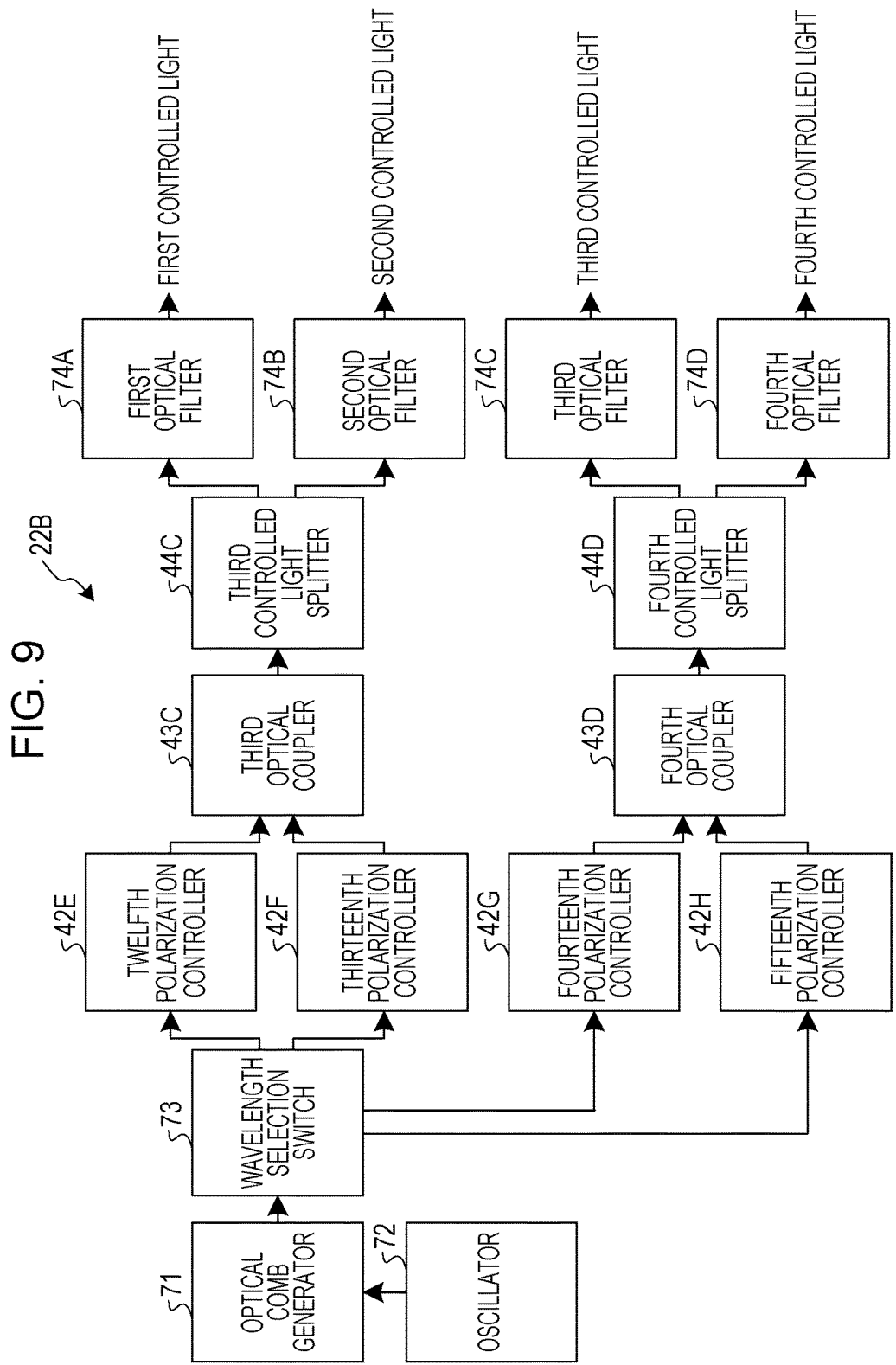

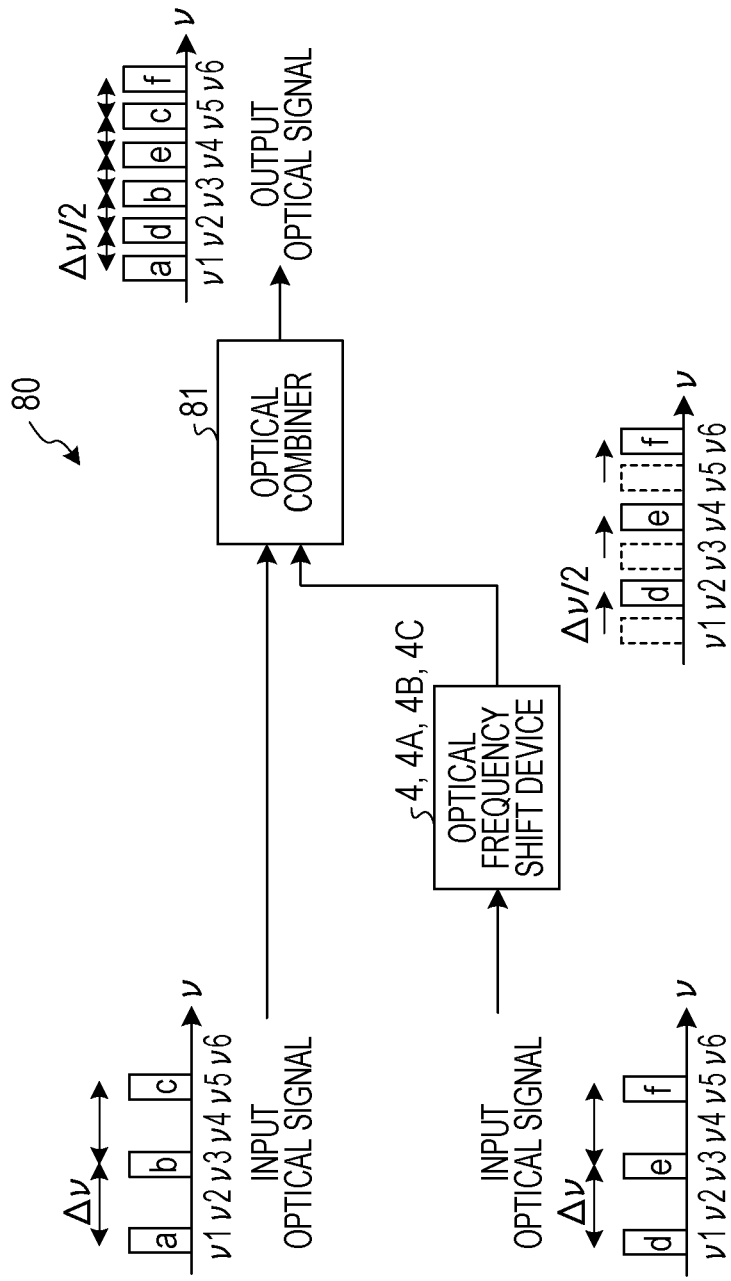

OPTICAL FREQUENCY SHIFT DEVICE AND METHOD

CROSS-REFERENCE TO RELATED APPLICATION

This application is based upon and claims the benefit of priority of the prior Japanese Patent Application No. 2016-084807, filed on Apr. 20, 2016, the entire contents of which are incorporated herein by reference.

FIELD

The embodiments discussed herein are related to an optical frequency shift device and an optical frequency shift method.

BACKGROUND

In recent years, there has been a demand for freely controlling an optical frequency of an optical signal in order to, for example, increase a transmission capacity and improve flexibility of a network. However, in devices such as an optical vector modulator and an acousto-optic switch, a shift band of the optical frequency is limited and it is difficult to shift the optical frequency of the optical signal to another wavelength grid. Furthermore, a polarized multiplexed optical signal is difficult to handle in such devices. In view of this, opto-electro-optic conversion is performed to generate an optical signal of a desired optical frequency.

For example, in an optical add-drop multiplexer, when there is an optical signal desired to be changed only in optical frequency, the optical signal desired to be changed only in the optical frequency is outputted to a drop port to be converted into an electric signal, then the electric signal is again converted into an optical signal with the optical frequency changed, and the optical signal thus obtained is inputted from an add port. In short, in the optical add-drop multiplexer, it is possible to shift the optical frequency of the optical signal by performing the opto-electro-optic conversion.

Meanwhile, in a wavelength division multiplex (WDM) device, WDM signals are subjected to opto-electronic conversion and combined in an optical transmitter of a new optical frequency grid. In other words, in the WDM device, it is possible to shift the optical frequencies of the WDM signals and combine the WDM signals by performing the opto-electro-optic conversion.

The conventional techniques described above are described in Japanese Laid-open Patent Publication Nos. 4-45428 and 2004-93583.

SUMMARY

According to an aspect of the invention, an optical frequency shift device configured to shift a first optical signal of a first optical frequency to a second optical signal of a second optical frequency, the optical frequency shift device includes a splitter configured to split the first optical signal to an optical signal of a first polarization and an optical signal of a second polarization orthogonal to the first polarization, a generator configured to generate a first controlled light of the first polarization, a second controlled light of the second polarization, a third controlled light of the second polarization, and a fourth controlled light of the first polarization, each of frequency differences between the first controlled light and the second controlled light and between the third controlled light and the fourth controlled light having a frequency spacing equal to a difference between the first optical frequency and the second optical frequency, a nonlinear optical medium in which an idler light of the second polarization is created by causing cross phase modulation of the optical signal of the first polarization, the first controlled light, and the second controlled light, and in which an idler light of the first polarization is created by causing cross phase modulation of the optical signal of the second polarization, the third controlled light, and the fourth controlled light, and an optical combiner configured to combine the idler light of the second polarization and the idler light of the first polarization so as to generate the second optical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is an experimental diagram illustrating an example of a third generator in a sixth embodiment; and FIG. 10 is an explanatory diagram illustrating an example of a WDM device in a seventh embodiment.

DESCRIPTION OF EMBODIMENTS

Generation of an optical signal of a desired optical frequency by performing opto-electro-optic conversion makes a large amount of power necessary and involves a light source with high optical frequency accuracy. Accordingly, there is a demand of achieving optical frequency shift not only of a single optical signal but also of multiple optical signals by several tens of GHz or more across optical frequency grids without electro-optic conversion, that is, achieving wideband optical frequency shift with low power consumption.

Embodiments of a technique capable of achieving wideband optical frequency shift not only of a single optical signal but also of multiple optical signals with low power consumption are described below in detail based on the drawings. Note that the disclosed technique is not limited by the embodiments. Moreover, the embodiments described below may be combined as appropriate within a scope where there is no conflict.

First Embodiment

Figure 1:
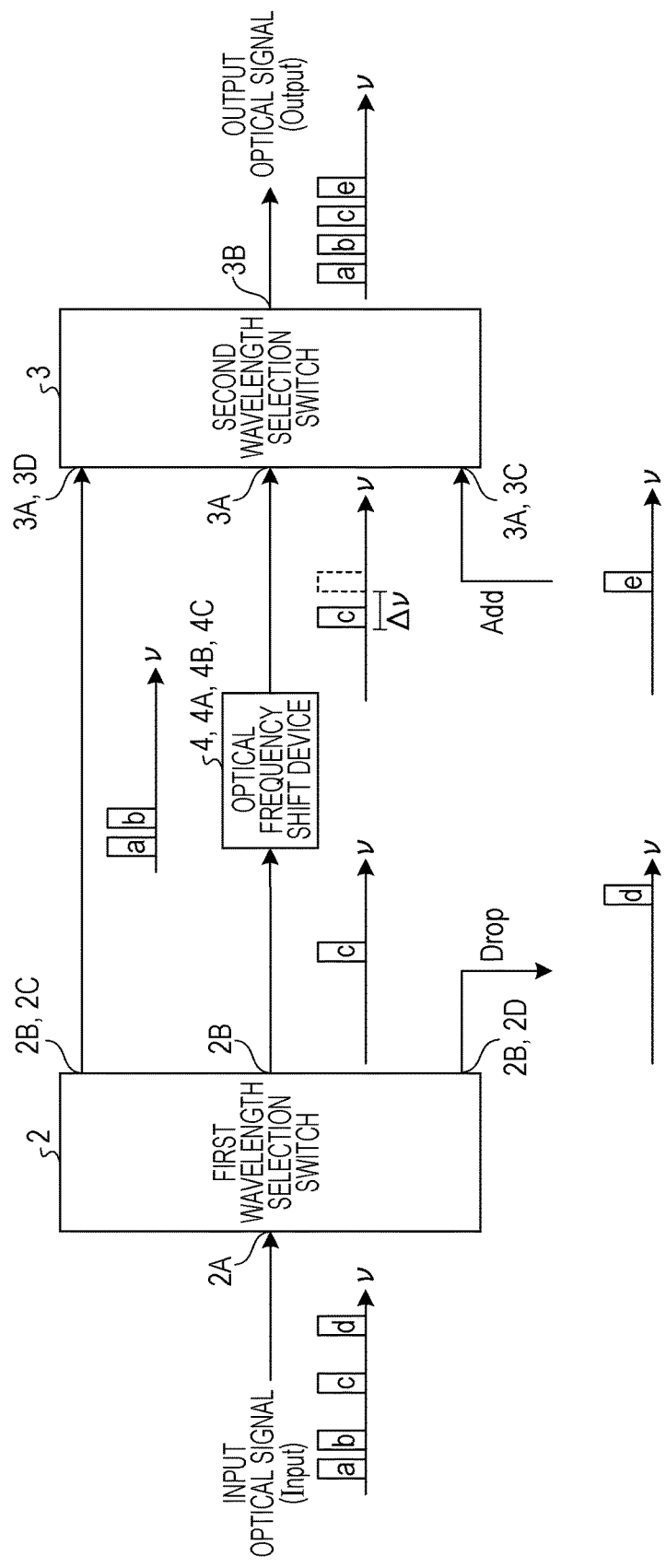
FIG. 1 is an explanatory diagram illustrating an example of a node in a first embodiment.

FIG. 1 is an explanatory diagram illustrating an example of a node in a first embodiment. The node 1 illustrated in FIG. 1 is a reconfigurable optical add/drop multiplexer (ROADM). The node 1 includes a first wavelength selection switch 2, a second wavelength selection switch 3, and an optical frequency shift device 4. The first wavelength selection switch 2 includes an input port 2A and an output port 2B. The output port 2B includes, for example, a through port 2C, a drop port 2D, and the like. The second wavelength selection switch 3 includes an input port 3A and an output port 3B. The input port 3A includes, for example, an add port 3C, a through port 3D, and the like.

The first wavelength selection switch 2 receives optical signals a, b, c, and d of different optical frequencies and outputs optical signals a and b of certain optical frequencies from the through port 2C to the second wavelength selection switch 3. Moreover, the first wavelength selection switch 2 outputs the optical signal d of a certain optical frequency from the drop port 2D. Furthermore, the first wavelength selection switch 2 outputs the optical signal c of a certain optical frequency to the optical frequency shift device 4. The optical frequency shift device 4 shifts the frequency of the optical signal c from $v0$ to $v0+\Delta v$, and outputs the shifted optical signal c to the second wavelength selection switch 3.

Moreover, the second wavelength selection switch 3 receives the optical signals a and b of the certain optical frequencies via the through port 3D and receives an optical signal e of a certain optical frequency via the add port 3C. The second wavelength selection switch 3 receives the shifted optical signal c from the optical frequency shift device 4. Then, the second wavelength selection switch 3 outputs the optical signals a, b, c, and e of the different optical frequencies via the output port 3B.

The optical frequency shift device 4 is disposed between the output port 2B of the first wavelength selection switch 2 and the input port 3A of the second wavelength selection switch 3, and shifts the frequency of the input optical signal c from the first optical frequency $v0$ to the second optical frequency $v0+\Delta v$. In other words, the optical frequency shift device 4 is capable of shifting the optical frequency by $\Delta v$.

Figure 2:
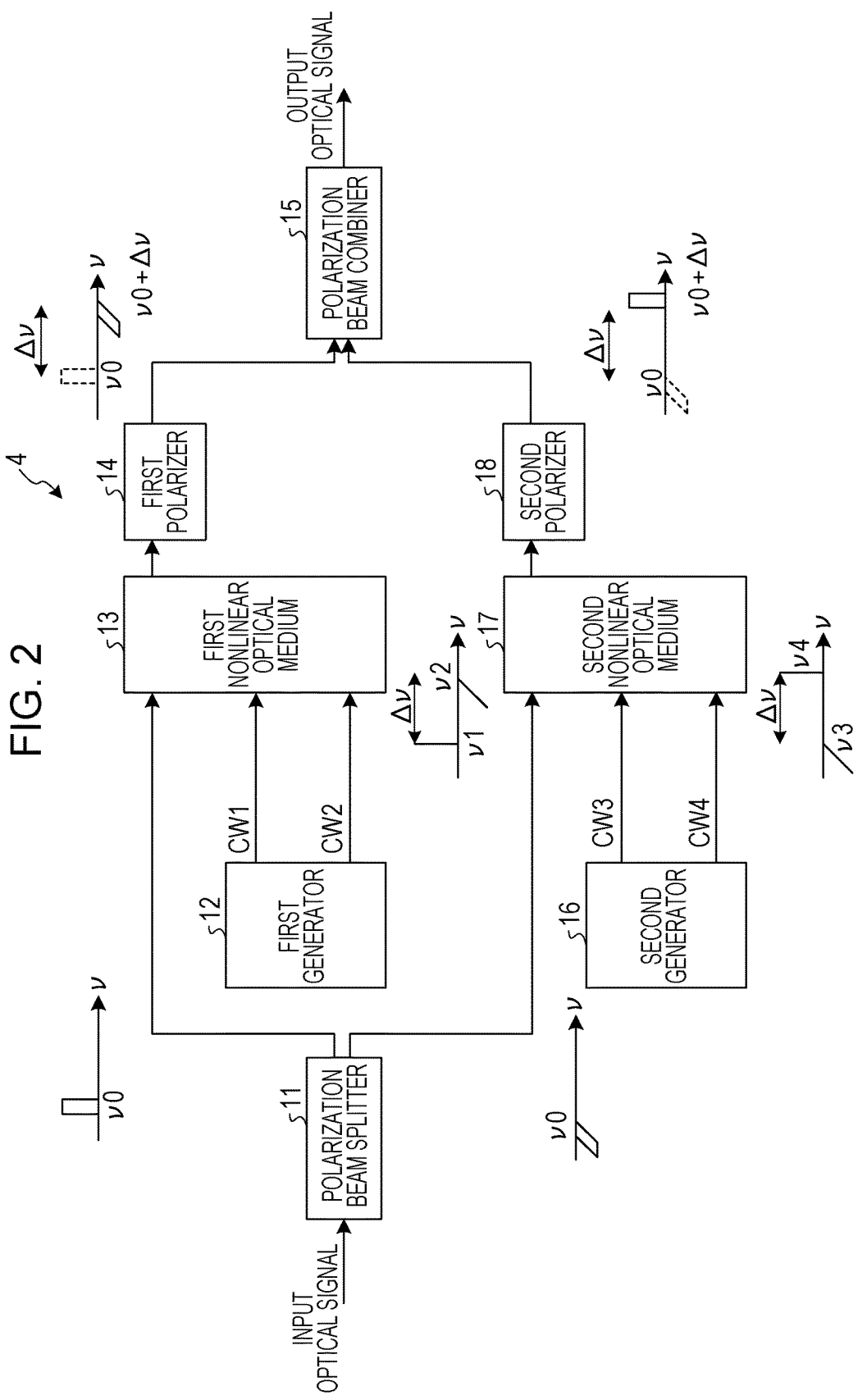
FIG. 2 is an explanatory diagram illustrating an example of an optical frequency shift device in the first embodiment.

FIG. 2 is an explanatory diagram illustrating an example of an optical frequency shift device 4 in the first embodiment. The optical frequency shift device 4 illustrated in FIG. 2 includes a polarization beam splitter 11, a first generator 12, a first nonlinear optical medium 13, a first polarizer 14, and a polarization beam combiner 15. The optical frequency shift device 4 includes a second generator 16, a second nonlinear optical medium 17, and a second polarizer 18.

The polarization beam splitter 11 splits the input optical signal into a horizontally-polarized optical signal and a vertically-polarized optical signal. The polarization beam splitter 11 inputs the horizontally-polarized optical signal into the first nonlinear optical medium 13 and inputs the vertically-polarized optical signal into the second nonlinear optical medium 17.

The first generator 12 generates a horizontally-polarized first controlled light which is a first continuous wave CW1 and a vertically-polarized second controlled light which is a second continuous wave CW2. An optical frequency spacing between the optical frequency $v1$ of the first controlled light and the optical frequency $v2$ of the second controlled light is $v2-v1=\Delta v$. The second controlled light is in a polarization state of vertical polarization orthogonal to the first controlled light. Note that the optical frequency $v1$ of the first controlled light and the optical frequency $v2$ of the second controlled light are different from the first optical frequency $v0$ of the input optical signal. The optical frequency spacing $\Delta v$ between the first controlled light and the second controlled light is the same as the difference between the optical frequency of the input optical signal and the optical frequency of the output optical signal. When $v2>v1$, the frequency is shifted to the higher frequency side and, when $v2<v1$, the frequency is shifted to the lower frequency side.

Figure 3:
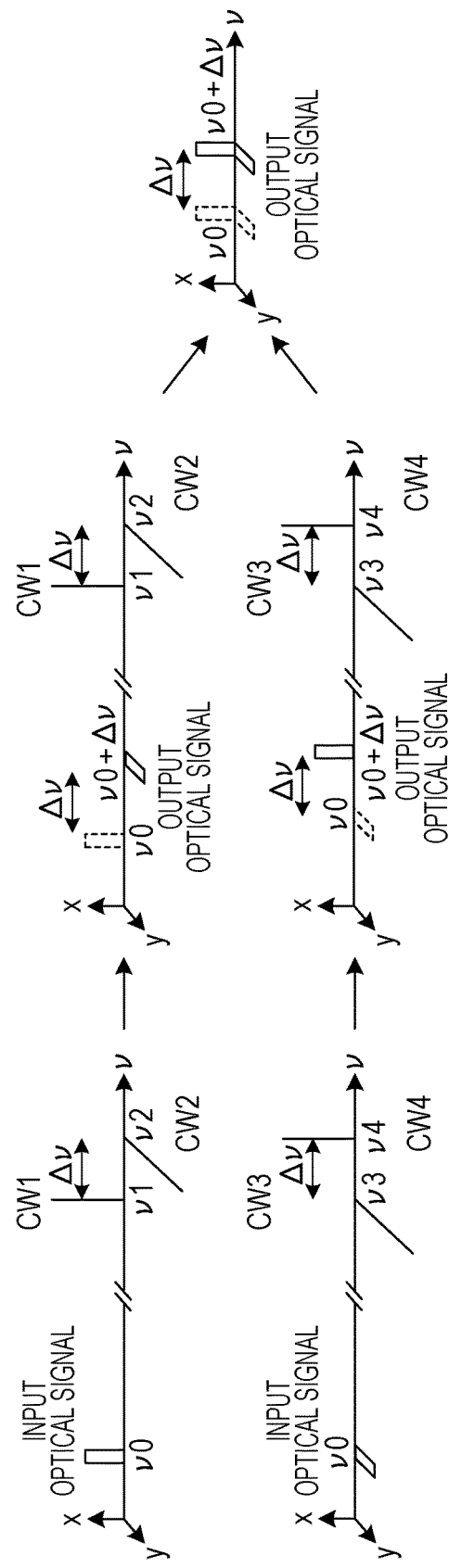
FIG. 3 is an explanatory diagram illustrating an example of input optical signals and output optical signals of a first nonlinear optical medium and a second nonlinear optical medium.

The first nonlinear optical medium 13 is assumed to be achieved by a high refractivity difference optical waveguide or a periodically poled electro-optic crystal which has a core of an optical waveguide, a highly-nonlinear fiber, silicon, or the like, for example. Note that, in the first nonlinear optical medium 13, multiple optical signals of different optical frequencies are inputted, nonlinear optical effects such as four-wave mixing and cross phase modulation occur, and an idler light of the input optical signal is generated. The first nonlinear optical medium 13 receives the horizontally-polarized input optical signal, the horizontally-polarized first controlled light, and the vertically-polarized second controlled light. Since the horizontally-polarized input optical signal, the first controlled light, and the second controlled light are subjected to the cross phase modulation by the nonlinear optical effect of the first nonlinear optical medium 13, the first nonlinear optical medium 13 outputs an optical signal including a vertically-polarized idler light Eyi orthogonal to the horizontally-polarized input optical signal. FIG. 3 is an explanatory diagram illustrating an example of the input optical signals and the output optical signal of the first nonlinear optical medium 13 and the second nonlinear optical medium 17. The output optical signal is obtained by shifting the horizontally-polarized input optical signal from the first optical frequency $v0$ to the second optical frequency $v0+\Delta v$, as the vertically-polarized idler light Eyi. Note that the shift amount of the optical frequency is equal to the frequency spacing between the optical frequency of the first controlled light and the optical frequency of the second controlled light.

The first polarizer 14 transmits only the vertically-polarized idler light Eyi in the optical signal outputted from the first nonlinear optical medium 13, and outputs the vertically-polarized idler light Eyi to the polarization beam combiner 15. Note that the polarization extinction ratio of the first polarizer 14 determines the extinction ratio of the input optical signal to the output optical signal.

The second generator 16 generates a vertically-polarized third controlled light which is a third continuous wave CW3 and a horizontally-polarized fourth controlled light which is a fourth continuous wave CW4. An optical frequency spacing between the optical frequency $v3$ of the third controlled light and an optical frequency $v4$ of the fourth controlled light is $v4-v3=\Delta v$. The third controlled light is in a polarization state of the vertical polarization orthogonal to the fourth controlled light. Note that the optical frequency $v3$ of the third controlled light and the optical frequency $v4$ of the fourth controlled light are different from the first optical frequency $v0$ of the input optical signal. The optical frequency spacing $\Delta v$ between the third controlled light and the fourth controlled light is the same as the difference between the optical frequency of the input optical signal and the optical frequency of the output optical signal. When $v4>v3$, the frequency is shifted to the higher frequency side and, when $v4<v3$, the frequency is shifted to the lower frequency side.

The second nonlinear optical medium 17 receives the vertically-polarized input optical signal, the vertically-polarized third controlled light, and the horizontally-polarized fourth controlled light. Note that the second nonlinear optical medium 17 is made of the same material as that of the first nonlinear optical medium 13. Since the vertically-polarized input optical signal, the third controlled light, and the fourth controlled light are subjected to the cross phase modulation by the nonlinear optical effect of the second nonlinear optical medium 17, the second nonlinear optical medium 17 outputs an optical signal including a horizontally-polarized idler light Exi orthogonal to the vertically-polarized input optical signal. The output optical signal is obtained by shifting the vertically-polarized input optical signal from the first optical frequency ν0 to the second optical frequency ν0+Δν, as the horizontally-polarized idler light Exi. Note that the shift amount of the optical frequency is equal to the frequency spacing between the optical frequency of the third controlled light and the optical frequency of the fourth controlled light.

The second polarizer 18 transmits only the horizontally-polarized idler light Exi in the optical signal outputted from the second nonlinear optical medium 17, and outputs the horizontally-polarized idler light Exi to the polarization beam combiner 15. Note that the polarization extinction ratio of the second polarizer 18 determines the extinction ratio of the input optical signal to the output optical signal.

The polarization beam combiner 15 combines the vertically-polarized idler light Eyi and the horizontally-polarized idler light Exi so as to output an optical signal shifted to the second optical frequency.

In the optical frequency shift device 4 of the first embodiment, the vertically-polarized idler light Eyi is generated by causing the cross phase modulation of the horizontally-polarized input optical signal, the horizontally-polarized first controlled light, and the vertically-polarized second controlled light. In addition, in the optical frequency shift device 4, the horizontally-polarized idler light Exi is generated by causing the cross phase modulation of the vertically-polarized input optical signal, the vertically-polarized third controlled light, and the horizontally-polarized fourth controlled light. The optical frequency shift device 4 combines the vertically-polarized idler light Eyi and the horizontally-polarized idler light Exi so as to achieve the optical phase shift from the first optical frequency ν0 to the second optical frequency ν0+Δν. As a result, it is possible to achieve the wide band optical frequency shift with low power consumption.

The optical frequency shift device 4 is capable of adjusting the shift amount of the optical frequency based on the optical frequency spacing between the optical frequency of the first controlled light and the optical frequency of the second controlled light and the optical frequency spacing between the optical frequency of the third controlled light and the optical frequency of the fourth controlled light.

A conventional optical frequency shift device is capable of achieving the optical frequency shift by using interference of four phase-modulated lights and acousto-optic effects. However, the shift amount is limited in the modulation band and is about several tens of GHz at maximum. Moreover, in the case of using the interference of phase-modulated lights, the extinction ratio of the input optical signal to the output optical signal decreases due to incompleteness of the interference. Meanwhile, since the optical frequency shift device 4 of the embodiment utilizes the cross phase modulation by the nonlinear optical media as the wideband phase modulation, it is possible to achieve the wideband optical phase shift.

It is possible to achieve the optical frequency shift of the input optical signal by using a difference frequency being the difference between the first controlled light and the second controlled light and a difference frequency being the difference between the third controlled light and the fourth controlled light. The accuracy of the difference frequencies is determined by the optical frequency accuracy of the first continuous wave CW1, the second continuous wave CW2, the third continuous wave CW3, and the fourth continuous wave CW4. Since the input optical signal is polarized and split into the horizontally-polarized optical signal and the vertically-polarized optical signal, it is possible to achieve optical frequency shift without polarization dependency.

Second Embodiment

Figure 4:
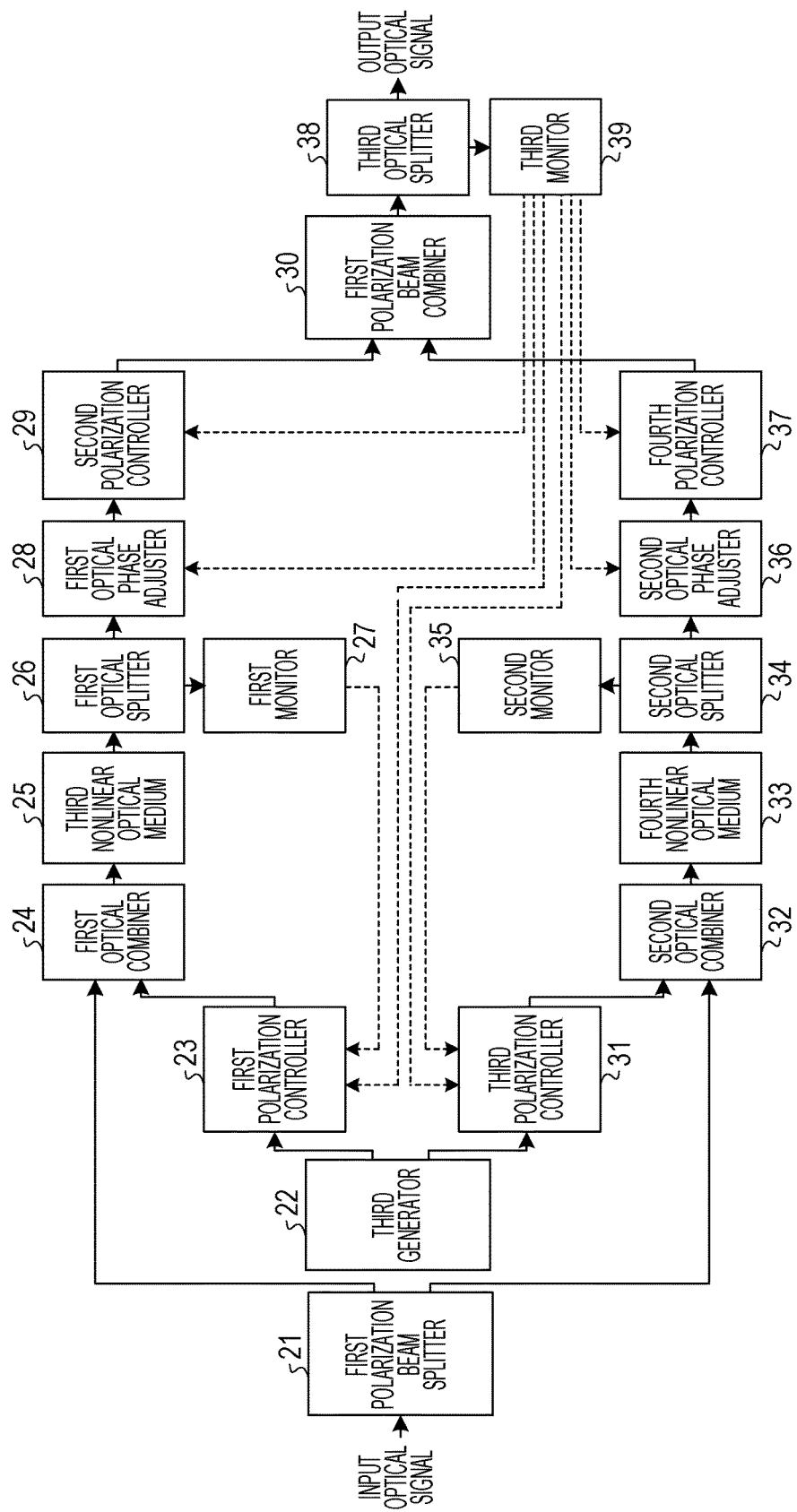
FIG. 4 is an explanatory diagram illustrating an example of an optical frequency shift device in a second embodiment.

FIG. 4 is an explanatory diagram illustrating an example of an optical frequency shift device 4A in a second embodiment. The optical frequency shift device 4A illustrated in FIG. 4 includes a first polarization beam splitter 21, a third generator 22, a first polarization controller 23, a first optical combiner 24, a third nonlinear optical medium 25, a first optical splitter 26, and a first monitor 27. The optical frequency shift device 4A includes a first optical phase adjuster 28, a second polarization controller 29, and a first polarization beam combiner 30. The optical frequency shift device 4A includes a third polarization controller 31, a second optical combiner 32, a fourth nonlinear optical medium 33, a second optical splitter 34, and a second monitor 35. The optical frequency shift device 4A includes a second optical phase adjuster 36, a fourth polarization controller 37, a third optical splitter 38, and a third monitor 39.

The first polarization beam splitter 21 splits the input optical signal into a horizontally-polarized optical signal and a vertically-polarized optical signal. The third generator 22 generates the first continuous wave CW1 of the optical frequency ν1, the second continuous wave CW2 of the optical frequency ν2, the third continuous wave CW3 of the optical frequency ν3, and the fourth continuous wave CW4 of the optical frequency ν4. The first polarization controller 23 performs polarization control on the first continuous wave CW1 of the optical frequency ν1 to generate the horizontally-polarized first controlled light, and performs polarization control on the second continuous wave CW2 of the optical frequency ν2 to generate the vertically-polarized second controlled light orthogonal to the first controlled light. The first polarization controller 23 then outputs the first controlled light and the second controlled light to the first optical combiner 24.

The first optical combiner 24 combines the horizontally-polarized optical signal from the first polarization beam splitter 21 with the horizontally-polarized first controlled light and the vertically-polarized second controlled light and inputs the combined optical signal into the third nonlinear optical medium 25. The combined optical signal of the horizontally-polarized optical signal, the horizontally-polarized first controlled light, and the vertically-polarized second controlled light is subjected to the cross phase modulation by the nonlinear optical effect of the third nonlinear optical medium 25, and the third nonlinear optical medium 25 thereby outputs an optical signal including the vertically-polarized idler light Eyi to the first optical splitter 26.

The first optical splitter 26 optically divides the light outputted from the third nonlinear optical medium 25 and sends the divided lights to the first optical phase adjuster 28 and the first monitor 27. The first monitor 27 monitors the optical intensity of the outputted light and notifies the result of this monitoring to the first polarization controller 23. The first polarization controller 23 performs polarization control on the first controlled light and the second controlled light based on the monitoring result of the first monitor 27. For example, the first polarization controller 23 performs feedback control such that the light intensity of a component of an optical frequency v0−Δv is minimized, based on the monitoring result of the first monitor 27.

The first optical phase adjuster 28 adjusts the phase of the vertically-polarized idler light Eyi, based on the monitoring result of the first monitor 27. The first optical phase adjuster 28 adjusts the phase such that the optical delay of the vertically-polarized idler light Eyi matches that of the horizontally-polarized idler light Exi to be described later, based on a test pulse signal or a known signal sequence in the input signal. Note that the adjustment may be optimized by adding a dither signal. The second polarization controller 29 controls the polarization state of the vertically-polarized idler light Eyi subjected to the optical phase adjustment such that the vertically-polarized idler light Eyi may be transmitted through and outputted from the first polarization beam combiner 30, and outputs the vertically-polarized idler light Eyi to the first polarization beam combiner 30.

Meanwhile, the third polarization controller 31 performs polarization control on the third continuous wave CW3 of the optical frequency v3 to generate the vertically-polarized third controlled light, and performs polarization control on the fourth continuous wave CW4 of the optical frequency v4 to generate the horizontally-polarized fourth controlled light orthogonal to the third controlled light. The third polarization controller 31 then outputs the vertically-polarized third controlled light and the horizontally-polarized fourth controlled light orthogonal to the third controlled light to the second optical combiner 32. The second optical combiner 32 combines the vertically-polarized input optical signal from the first polarization beam splitter 21 with the vertically-polarized third controlled light and the horizontally-polarized fourth controlled light and outputs the combined optical signal to the fourth nonlinear optical medium 33. The combined optical signal of the vertically-polarized optical signal, the third controlled light, and the fourth controlled light is subjected to the cross phase modulation by the nonlinear optical effect of the fourth nonlinear optical medium 33, and the fourth nonlinear optical medium 33 thereby outputs an optical signal including the horizontally-polarized idler light Exi to the second optical splitter 34.

The second optical splitter 34 optically divides the light outputted from the fourth nonlinear optical medium 33 and sends the divided lights to the second optical phase adjuster 36 and the second monitor 35. The second monitor 35 monitors the optical intensity of the outputted light and notifies the result of this monitoring to the third polarization controller 31. The third polarization controller 31 performs polarization control on the third controlled light and the fourth controlled light based on the monitoring result of the second monitor 35. For example, the third polarization controller 31 performs feedback control such that the light intensity of the component of the optical frequency v0−Δv is minimized, based on the monitoring result of the second monitor 35.

The second optical phase adjuster 36 adjusts the phase of the horizontally-polarized idler light Exi, based on the monitoring result of the second monitor 35. The second optical phase adjuster 36 adjusts the phase such that the optical delay of the horizontally-polarized idler light Exi matches that of the vertically-polarized idler light Eyi described above, based on the test pulse signal or the known signal sequence in the input signal. The fourth polarization controller 37 controls the polarization state of the horizontally-polarized idler light Exi subjected to the optical phase adjustment such that the horizontally-polarized idler light Exi may be transmitted through and outputted from the first polarization beam combiner 30, and outputs the horizontally-polarized idler light Exi to the first polarization beam combiner 30.

The first polarization beam combiner 30 couples the vertically-polarized idler light Eyi from the second polarization controller 29 and the horizontally-polarized idler light Exi from the fourth polarization controller 37 to output an optical signal of a second optical frequency v0+Δv to the third optical splitter 38. The third optical splitter 38 divides the light outputted from the first polarization beam combiner 30 and sends the divided lights to an output stage and the third monitor 39. The third monitor 39 monitors the optical intensity of the outputted light (idler light) and notifies the result of this monitoring to the first polarization controller 23, the first optical phase adjuster 28, the second polarization controller 29, the third polarization controller 31, the second optical phase adjuster 36, and the fourth polarization controller 37.

The first polarization controller 23, the first optical phase adjuster 28, and the second polarization controller 29 perform feedback control such that the optical intensity of the idler light is maximized, based on the monitoring result of the third monitor 39. The third polarization controller 31, the second optical phase adjuster 36, and the fourth polarization controller 37 perform feedback control such that the optical intensity of the idler light is maximized, based on the monitoring result of the third monitor 39.

Figure 5:
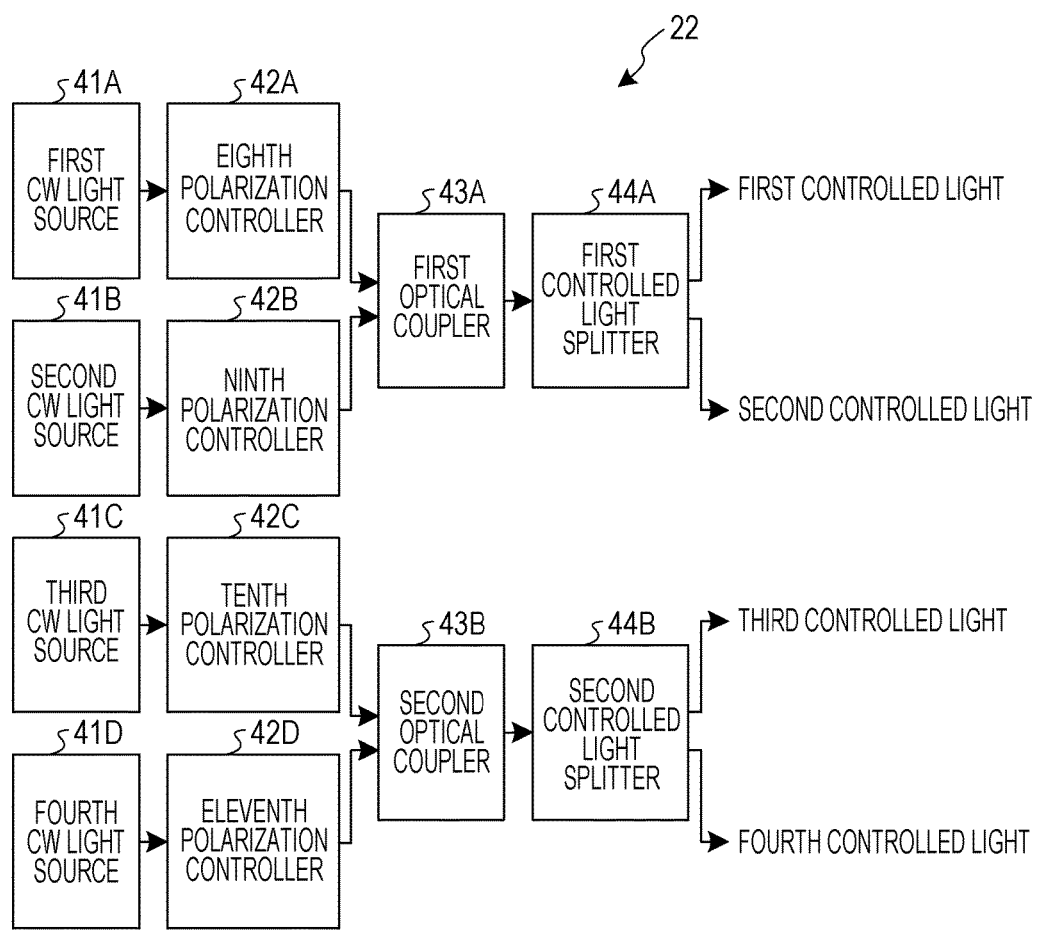
FIG. 5 is an explanatory diagram illustrating an example of a third generator.

FIG. 5 is an explanatory diagram illustrating an example of the third generator 22. The third generator 22 illustrated in FIG. 5 includes a first CW light source 41A, a second CW light source 41B, an eighth polarization controller 42A, a ninth polarization controller 42B, a first optical coupler 43A, and a first controlled light splitter 44A. The third generator 22 includes a third CW light source 41C, a fourth CW light source 41D, a tenth polarization controller 42C, an eleventh polarization controller 42D, a second optical coupler 43B, and a second controlled light splitter 44B.

The first CW light source 41A emits the first continuous wave CW1 of the optical frequency v1 and outputs the first continuous wave CW1 to the eighth polarization controller 42A. The eighth polarization controller 42A generates the horizontally-polarized first controlled light from the first continuous wave CW1 and outputs the first controlled light to the first optical coupler 43A.

The second CW light source 41B emits the second continuous wave CW2 of the optical frequency v2 and outputs the second continuous wave CW2 to the ninth polarization controller 42B. The ninth polarization controller 42B generates the vertically-polarized second controlled light from the second continuous wave CW2 and outputs the vertically-polarized second controlled light to the first optical coupler 43A.

The first optical coupler 43A combines the horizontally-polarized first controlled light from the eighth polarization controller 42A and the vertically-polarized second controlled light from the ninth polarization controller 42B, and outputs the combined light to the first controlled light splitter 44A. The first controlled light splitter 44A dividedly outputs the first controlled light and the second controlled light.

The third CW light source 41C emits the third continuous wave CW3 of the optical frequency v3 and outputs the third continuous wave CW3 to the tenth polarization controller 42C. The tenth polarization controller 42C generates the vertically-polarized third controlled light from the third continuous wave CW3 and outputs the third controlled light to the second optical coupler 43B.

The fourth CW light source 41D emits the fourth continuous wave CW4 of the optical frequency ν4 and outputs the fourth continuous wave CW4 to the eleventh polarization controller 42D. The eleventh polarization controller 42D generates the horizontally-polarized fourth controlled light orthogonal to the third controlled light, from the fourth continuous wave CW4 and outputs the horizontally-polarized fourth controlled light to the second optical coupler 43B.

The second optical coupler 43B combines the vertically-polarized third controlled light from the tenth polarization controller 42C and the horizontally-polarized fourth controlled light from the eleventh polarization controller 42D, and outputs the combined light to the second controlled light splitter 44B. The second controlled light splitter 44B dividedly outputs the third controlled light and the fourth controlled light.

Next, operations of the optical frequency shift device 4A in the second embodiment are described.

The horizontally-polarized input optical signal, the horizontally-polarized first controlled light, and the vertically-polarized second controlled light are subjected to the cross phase modulation by the nonlinear optical effect of the third nonlinear optical medium 25 illustrated in FIG. 4, and the third nonlinear optical medium 25 outputs the vertically-polarized idler light Eyi of the horizontally-polarized input optical signal to the first optical splitter 26. The first optical phase adjuster 28 adjusts the phase of the vertically-polarized idler light Eyi and outputs the vertically-polarized idler light Eyi subjected to the phase adjustment to the second polarization controller 29. Then, the second polarization controller 29 outputs the vertically-polarized idler light Eyi to the first polarization beam combiner 30.

The vertically-polarized input optical signal, the vertically-polarized third controlled light, and the horizontally-polarized fourth controlled light are subjected to the cross phase modulation by the nonlinear optical effect of the fourth nonlinear optical medium 33, and the fourth nonlinear optical medium 33 outputs the horizontally-polarized idler light Exi of the vertically-polarized input optical signal to the second optical splitter 34. Then, the second optical phase adjuster 36 adjusts the phase of the horizontally-polarized idler light Exi and outputs the horizontally-polarized idler light Exi subjected to the phase adjustment to the fourth polarization controller 37. Then, the fourth polarization controller 37 outputs the horizontally-polarized idler light Exi to the first polarization beam combiner 30.

The first polarization beam combiner 30 couples the vertically-polarized idler light Eyi from the second polarization controller 29 and the horizontally-polarized idler light Exi from the fourth polarization controller 37 to output the optical signal of the optical frequency ν0+Δν. As a result, it is possible to shift the optical signal from the first optical frequency to the second optical frequency ν0+Δν.

The horizontally-polarized input optical signal, the horizontally-polarized first controlled light, and vertically-polarized second controlled light are subjected to the cross phase modulation by the nonlinear optical effect of the optical frequency shift device 4A of the second embodiment, and the optical frequency shift device 4A outputs the vertically-polarized idler light Eyi of the horizontally-polarized input optical signal. In addition, the vertically-polarized input optical signal, the vertically-polarized third controlled light, and horizontally-polarized fourth controlled light are subjected to the cross phase modulation by the nonlinear optical effect of the optical frequency shift device 4A, and the optical frequency shift device 4A outputs the horizontally-polarized idler light Exi of the vertically-polarized input optical signal. Then, the optical frequency shift device 4A couples the vertically-polarized idler light Eyi and the horizontally-polarized idler light Exi and shifts the optical signal from the first optical frequency to the second optical frequency. As a result, it is possible to achieve wideband optical frequency shift with low power consumption without polarization dependency.

The optical frequency shift device 4A outputs the horizontally-polarized first controlled light by using the first continuous wave CW1 from the first CW light source 41A and outputs the vertically-polarized second controlled light by using the second continuous wave CW2 from the second CW light source 41B. Furthermore, the optical frequency shift device 4A outputs the vertically-polarized third controlled light by using the third continuous wave CW3 from the third CW light source 41C and outputs the horizontally-polarized fourth controlled light by using the fourth continuous wave CW4 from the fourth CW light source 41D. As a result, the optical frequency shift device 4A is capable of generating the first controlled light, the second controlled light, the third controlled light, and the fourth controlled light.

Note that, in the third generator 22, the first controlled light, the second controlled light, the third controlled light, and the fourth controlled light have different optical frequencies, respectively. However, the first controlled light and the third controlled light may have the same optical frequency, and the second controlled light and the fourth controlled light may have the same optical frequency. The optical frequencies may be changed as appropriate.

Third Embodiment

Figure 6:
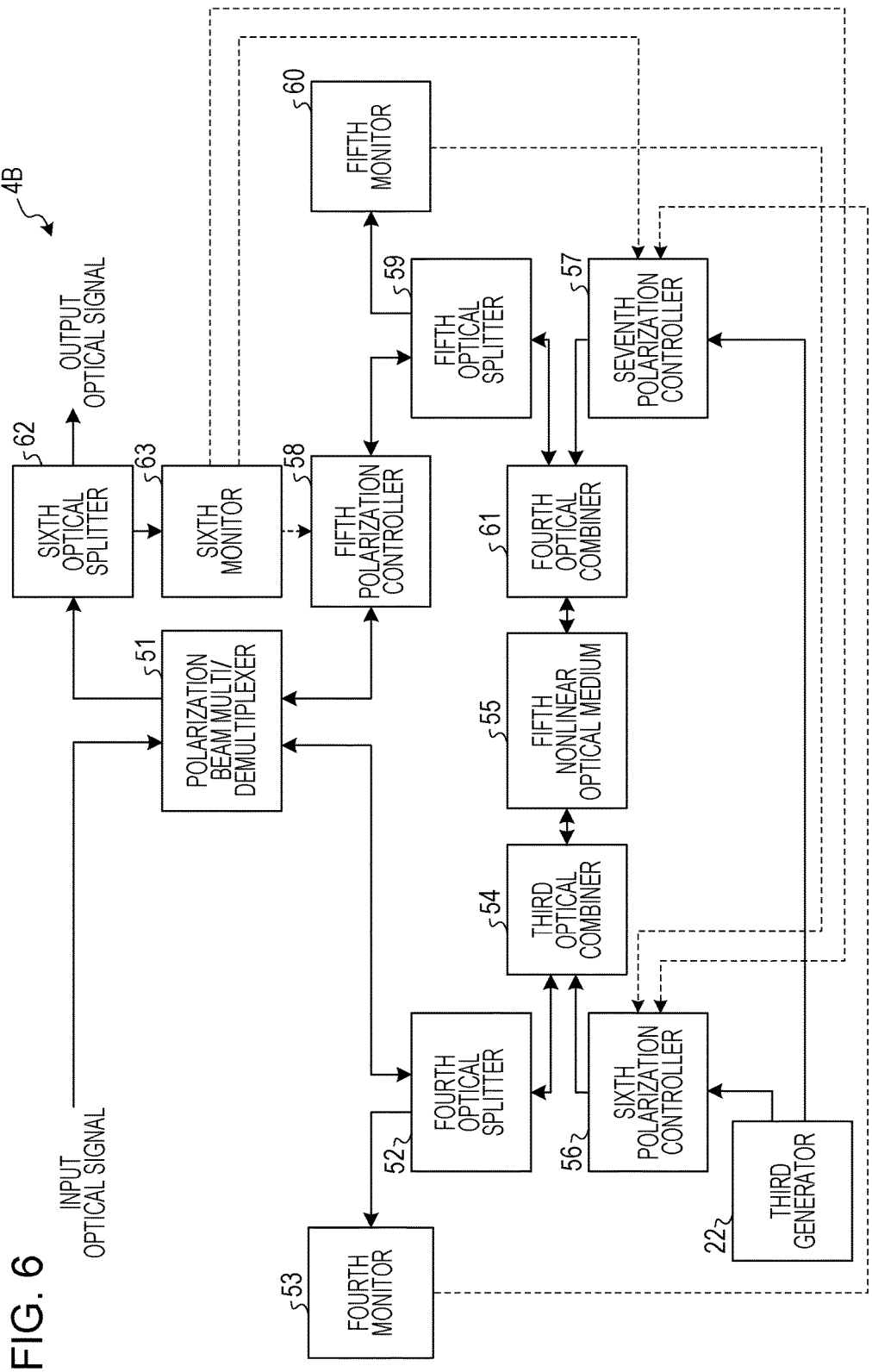
FIG. 6 is an explanatory diagram illustrating an example of an optical frequency shift device in a third embodiment.

FIG. 6 is an explanatory diagram illustrating an example of an optical frequency shift device 4B in a third embodiment. Note that the same configurations as those in the optical frequency shift device 4A of the second embodiment are denoted by the same reference numerals, and overlapping description of the configurations and the operations is omitted. The optical frequency shift device 4B illustrated in FIG. 6 includes a polarization beam multi/demultiplexer 51, a fourth optical splitter 52, a fourth monitor 53, a third optical combiner 54, and a fifth nonlinear optical medium 55. Furthermore, the optical frequency shift device 4B includes the third generator 22, a sixth polarization controller 56, and a seventh polarization controller 57. The optical frequency shift device 4B includes a fifth polarization controller 58, a fifth optical splitter 59, a fifth monitor 60, a fourth optical combiner 61, a sixth optical splitter 62, and a sixth monitor 63.

The polarization beam multi/demultiplexer 51 splits the input optical signal into a horizontally-polarized optical signal and a vertically-polarized optical signal to output the split signals. The polarization beam multi/demultiplexer 51 outputs the horizontally-polarized optical signal to the fourth optical splitter 52. The fourth optical splitter 52 dividedly outputs the horizontally-polarized optical signal to the fourth monitor 53 and the third optical combiner 54.

The third generator 22 outputs the first continuous wave CW1 of the optical frequency ν1 and the second continuous wave CW2 of the optical frequency ν2 to the sixth polarization controller 56. The sixth polarization controller 56 outputs the horizontally-polarized first controlled light by using the first continuous wave CW1 and the vertically-polarized second controlled light orthogonal to the first controlled light by using the second continuous wave CW2, to the third optical combiner 54. The third optical combiner 54 outputs a combined optical signal obtained by combining the horizontally-polarized optical signal, the horizontally-polarized first controlled light, and the vertically-polarized second controlled light, to the fifth nonlinear optical medium 55.

The combined optical signal of the horizontally-polarized optical signal, the horizontally-polarized first controlled light, and the vertically-polarized second controlled light is subjected to the cross phase modulation by the nonlinear optical effect of the fifth nonlinear optical medium 55, and the fifth nonlinear optical medium 55 outputs the vertically-polarized idler light Eyi to the fourth optical combiner 61. The fourth optical combiner 61 outputs the vertically-polarized idler light Eyi to the fifth optical splitter 59. The fifth optical splitter 59 outputs the vertically-polarized idler light Eyi to the fifth monitor 60 and the fifth polarization controller 58. The fifth polarization controller 58 performs polarization control on the vertically-polarized idler Eyi to obtain the horizontally-polarized idler light Exi and outputs the horizontally-polarized idler light Exi to the polarization beam multi/demultiplexer 51. The polarization beam multi/demultiplexer 51 receives the horizontally-polarized idler light Exi in a counterclockwise route from the fourth optical splitter 52, to the third optical combiner 54, to the fifth nonlinear optical medium 55, to the fourth optical combiner 61, to the fifth optical splitter 59, to the fifth polarization controller 58, and to the polarization beam multi/demultiplexer 51.

The polarization beam multi/demultiplexer 51 outputs the vertically-polarized optical signal divided from the input optical signal to the fifth polarization controller 58. The fifth polarization controller 58 performs polarization control on the vertically-polarized optical signal to obtain a horizontally-polarized optical signal and outputs the horizontally-polarized optical signal to the fifth optical splitter 59. The fifth optical splitter 59 dividedly outputs the horizontally-polarized optical signal to the fifth monitor 60 and the fourth optical combiner 61.

The seventh polarization controller 57 receives the third continuous wave CW3 of the optical frequency ν3 and the fourth continuous wave CW4 of the optical frequency ν4 from the third generator 22. The seventh polarization controller 57 performs polarization control on the third continuous wave CW3 to obtain the horizontally-polarized third controlled light and performs polarization control on the fourth continuous wave CW4 to obtain the vertically-polarized fourth controlled light orthogonal to the third controlled light. The seventh polarization controller 57 then outputs the third controlled light and the fourth controlled light to the fourth optical combiner 61.

The fourth optical combiner 61 combines the horizontally-polarized optical signal from the fifth optical splitter 59, the horizontally-polarized third controlled light, and the vertically-polarized fourth control and outputs the combined optical signal to the fifth nonlinear optical medium 55. The combined optical signal from the fourth optical combiner 61 is subjected to the cross phase modulation by the nonlinear optical effect of the fifth nonlinear optical medium 55, and the fifth nonlinear optical medium 55 outputs the vertically-polarized idler light Eyi to the third optical combiner 54. The third optical combiner 54 outputs the vertically-polarized idler light Eyi to the fourth optical splitter 52. The fourth optical splitter 52 outputs the vertically-polarized idler light Eyi to the fourth monitor 53 and the polarization beam multi/demultiplexer 51. The polarization beam multi/demultiplexer 51 receives the vertically-polarized idler light Eyi in a clockwise route from the fifth polarization controller 58, to the fifth optical splitter 59, to the fourth optical combiner 61, to the fifth nonlinear optical medium 55, to the third optical combiner 54, to the fourth optical splitter 52, and to the polarization beam multi/demultiplexer 51.

The polarization beam multi/demultiplexer 51 couples the horizontally-polarized idler Exi obtained in the counterclockwise route and the vertically-polarized idler light Eyi obtained in the clockwise route and outputs an optical signal whose frequency is shifted from the first optical frequency ν0 to the second optical frequency ν0+Δν.

The fifth nonlinear optical medium 55 of the optical frequency shift device 4B receives the first controlled light and the second controlled light from one input and receives the third controlled light and the fourth controlled light from another input. As a result, the signal quality of the controlled lights degrades due to back scattering caused by stimulated Brillouin scattering in the nonlinear optical medium (about 10 GHz in an optical fiber). The signal degrading due to the stimulated Brillouin scattering may be suppressed by varying the optical frequencies of the first controlled light, the second controlled light, the third controlled light, and the fourth controlled light. For example, when the fifth nonlinear optical medium 55 is an optical fiber, the differences between the optical frequencies of the first controlled light, the second controlled light, the third controlled light, and the fourth controlled light are preferably greater than 10 GHz.

Next, operations of the optical frequency shift device 4B in the third embodiment are described.

The polarization beam multi/demultiplexer 51 illustrated in FIG. 6 divides the input optical signal into the horizontally-polarized optical signal and the vertically-polarized optical signal and outputs the divided optical signals. The polarization beam multi/demultiplexer 51 outputs the horizontally-polarized optical signal to the third optical combiner 54 via the fourth optical splitter 52. Furthermore, the sixth polarization controller 56 outputs the first controlled light and the vertically-polarized second controlled light to the third optical combiner 54. The third optical combiner 54 combines the horizontally-polarized optical signal, the first controlled light, and the second controlled light and outputs the combined light to the fifth nonlinear optical medium 55.

The horizontally-polarized input optical signal, the horizontally-polarized first controlled light, and the vertically-polarized second controlled light are subjected to the cross phase modulation by the nonlinear optical effect of the fifth nonlinear optical medium 55, and the fifth nonlinear optical medium 55 thereby generates the vertically-polarized idler light Eyi of the horizontally-polarized input optical signal. The fifth nonlinear optical medium 55 outputs the vertically-polarized idler light Eyi of the horizontally-polarized input optical signal to the fifth polarization controller 58 via the fourth optical combiner 61 and the fifth optical splitter 59. The fifth polarization controller 58 performs polarization control on the vertically-polarized idler light Eyi to obtain the horizontally-polarized idler light Exi and outputs the horizontally-polarized idler light Exi to the polarization beam multi/demultiplexer 51.

The fifth polarization controller 58 performs polarization control on the vertically-polarized optical signal from the polarization beam multi/demultiplexer 51 to obtain the horizontally-polarized optical signal, and outputs the horizontally-polarized optical signal to the fourth optical combiner 61 via the fifth optical splitter 59. The seventh polarization controller 57 outputs the horizontally-polarized third controlled light and the vertically-polarized fourth controlled light to the fourth optical combiner 61.

The fourth optical combiner 61 combines the horizontally-polarized optical signal, the horizontally-polarized third controlled light, and the vertically-polarized fourth controlled light and outputs the combined light to the fifth nonlinear optical medium 55. The horizontally-polarized input optical signal, the horizontally-polarized third controlled light, and the vertically-polarized fourth controlled light are subjected to the cross phase modulation by the nonlinear optical effect of the fifth nonlinear optical medium 55, and the fifth nonlinear optical medium 55 thereby generates the vertically-polarized idler light Eyi of the horizontally-polarized input optical signal. The fifth nonlinear optical medium 55 outputs the vertically-polarized idler light Eyi of the horizontally-polarized input optical signal to the polarization beam multi/demultiplexer 51 via the third optical combiner 54 and the fourth optical splitter 52. The polarization beam multi/demultiplexer 51 couples the horizontally-polarized idler light Exi and the vertically-polarized idler light Eyi and outputs the optical signal whose frequency is shifted from the first optical frequency v0 to the second optical frequency v0+Δv.

The optical frequency shift device 4B of the third embodiment obtains the horizontally-polarized idler light Exi in the counterclockwise route of the fifth nonlinear optical medium 55 and obtains the vertically-polarized idler light Eyi in the clockwise route of the fifth nonlinear optical medium 55. The optical frequency shift device 4B couples the horizontally-polarized idler light Exi and the vertically-polarized idler light Eyi and shifts the optical signal of the first optical frequency to the second optical frequency. As a result, it is possible to achieve wideband optical frequency shift with low power consumption without polarization dependency. Moreover, the length matching of the routes does not have to be performed and the number of parts may be reduced because one nonlinear optical medium is sufficient.

Fourth Embodiment

Figure 7:
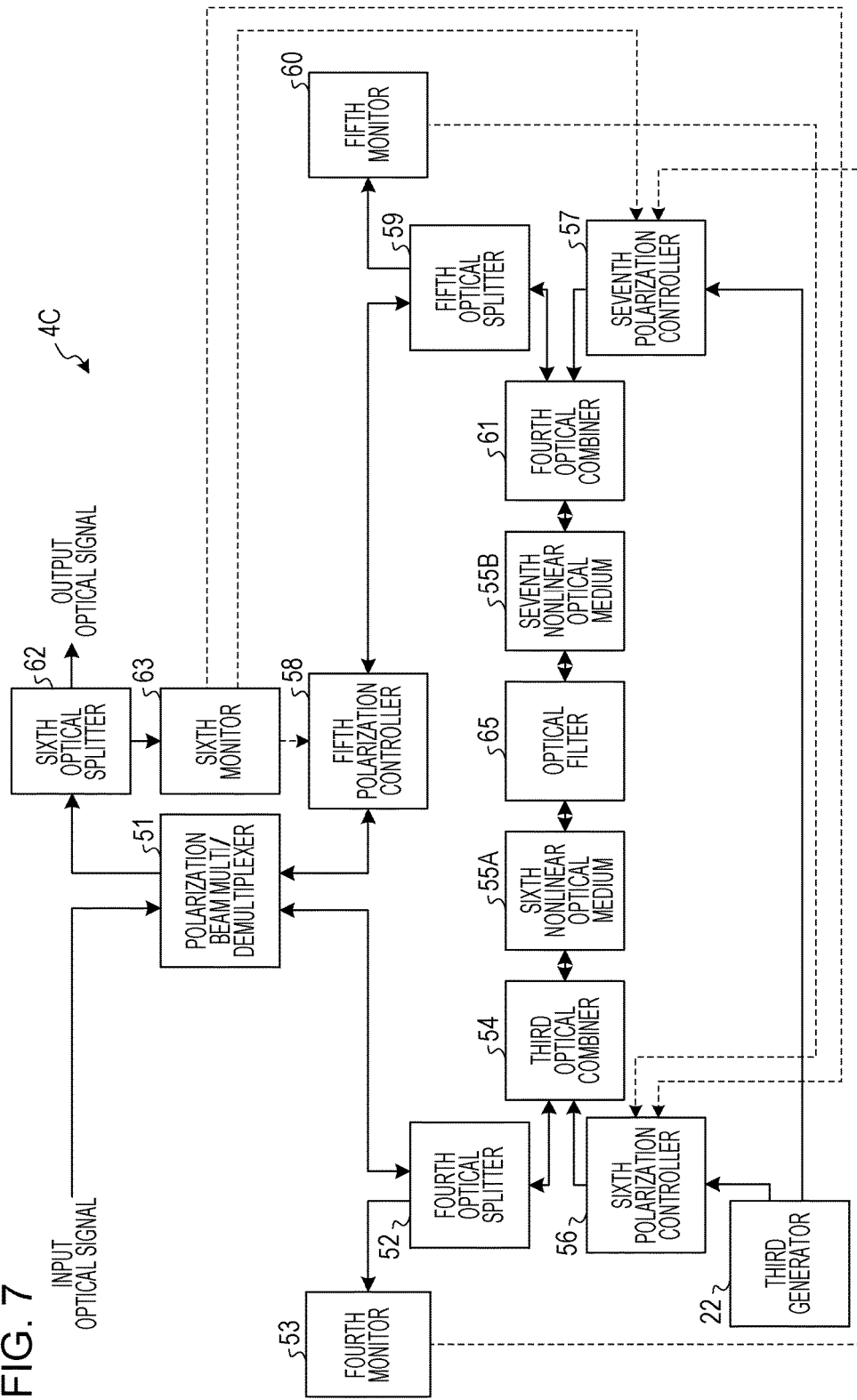
FIG. 7 is an explanatory view illustrating an example of an optical frequency shift device in a fourth embodiment.

FIG. 7 is an explanatory view illustrating an example of an optical frequency shift device 4C in a fourth embodiment. Note that the same configurations as those in the optical frequency shift device 4B of the third embodiment are denoted by the same reference numerals, and overlapping description of the configurations and the operations is omitted. The optical frequency shift device 4C illustrated in FIG. 7 is different from the optical frequency shift device 4B illustrated in FIG. 6 in that a sixth nonlinear optical medium 55A, an optical filter 65, and a seventh nonlinear optical medium 55B are used instead of the fifth nonlinear optical medium 55.

A combined light obtained by combining a horizontally-polarized optical signal from the third optical combiner 54, the horizontally-polarized first controlled light, and the vertically-polarized second controlled light is subjected to the cross phase modulation by the nonlinear optical effect of the sixth nonlinear optical medium 55A to obtain the vertically-polarized idler light Eyi, and the sixth nonlinear optical medium 55A outputs the vertically-polarized idler light Eyi to the optical filter 65. The optical filter 65 transmits the vertically-polarized idler light Eyi and outputs the vertically-polarized idler light Eyi to the fifth polarization controller 58 via the seventh nonlinear optical medium 55B, the fourth optical combiner 61, and the fifth optical splitter 59. The fifth polarization controller 58 performs polarization control on the vertically-polarized idler light Eyi to obtain the horizontally-polarized idler light Exi and outputs the horizontally-polarized idler light Exi to the polarization beam multi/demultiplexer 51. In other words, the polarization beam multi/demultiplexer 51 receives the horizontally-polarized idler light Exi in a counterclockwise route. The counterclockwise route is a route from the fourth optical splitter 52, to the third optical combiner 54, to the sixth nonlinear optical medium 55A, to the optical filter 65, to the seventh nonlinear optical medium 55B, to the fourth optical combiner 61, to the fifth optical splitter 59, to the fifth polarization controller 58, and to the polarization beam multi/demultiplexer 51.

A combined light obtained by combining a horizontally-polarized optical signal from the fourth optical combiner 61, the horizontally-polarized third controlled light, and the vertically-polarized fourth controlled light is subjected to the cross phase modulation by the nonlinear optical effect of the seventh nonlinear optical medium 55B, and the seventh nonlinear optical medium 55B thereby outputs the vertically-polarized idler light Eyi to the optical filter 65. The optical filter 65 transmits the vertically-polarized idler light Eyi and outputs the vertically-polarized idler light Eyi to the polarization beam multi/demultiplexer 51 via the sixth nonlinear optical medium 55A, the third optical combiner 54, and the fourth optical splitter 52. In other words, the polarization beam multi/demultiplexer 51 receives the vertically-polarized idler light Eyi in a clockwise route. The clockwise route is a route from the fifth polarization controller 58, to the fifth optical splitter 59, to the fourth optical combiner 61, to the seventh nonlinear optical medium 55B, to the optical filter 65, to the sixth nonlinear optical medium 55A, to the third optical combiner 54, to the fourth optical splitter 52, and to the polarization beam multi/demultiplexer 51.

The polarization beam multi/demultiplexer 51 couples the horizontally-polarized idler light Exi obtained in the counterclockwise route and the vertically-polarized idler light Eyi obtained in the clockwise route and outputs an optical signal whose frequency is shifted from the first optical frequency v0 to the second optical frequency v0+Δv.

The sixth nonlinear optical medium 55A and the seventh nonlinear optical medium 55B of the optical frequency shift device 4C receive the first controlled light and the second controlled light from one input and receive the third controlled light and the fourth controlled light from another input. In this case, the signal degrading due to the stimulated Brillouin scattering may be suppressed by varying the optical frequencies of the first controlled light, the second controlled light, the third controlled light, and the fourth controlled light. For example, when the sixth nonlinear optical medium 55A and the seventh nonlinear optical medium 55B are optical fibers, the differences between the optical frequencies of the first controlled light, the second controlled light, the third controlled light, and the fourth controlled light are preferably greater than 10 GHz.

The optical frequency shift device 4C of the fourth embodiment obtains the horizontally-polarized idler light Exi in the counterclockwise route and obtains the vertically-polarized idler light Eyi in the clockwise route. The optical frequency shift device 4C couples the horizontally-polarized idler light Exi and the vertically-polarized idler light Eyi and shifts the optical signal of the first optical frequency to the second optical frequency. As a result, it is possible to achieve wideband optical frequency shift with low power consumption without polarization dependency. Moreover, the length matching of the routes does not have to be performed.

Note that, as described above, the third generator 22 in the second embodiment is configured as illustrated in FIG. 5. However, the configuration of the third generator 22 is not limited to the configuration illustrated in FIG. 5 and may be changed as appropriate.

Fifth Embodiment

Figure 8:
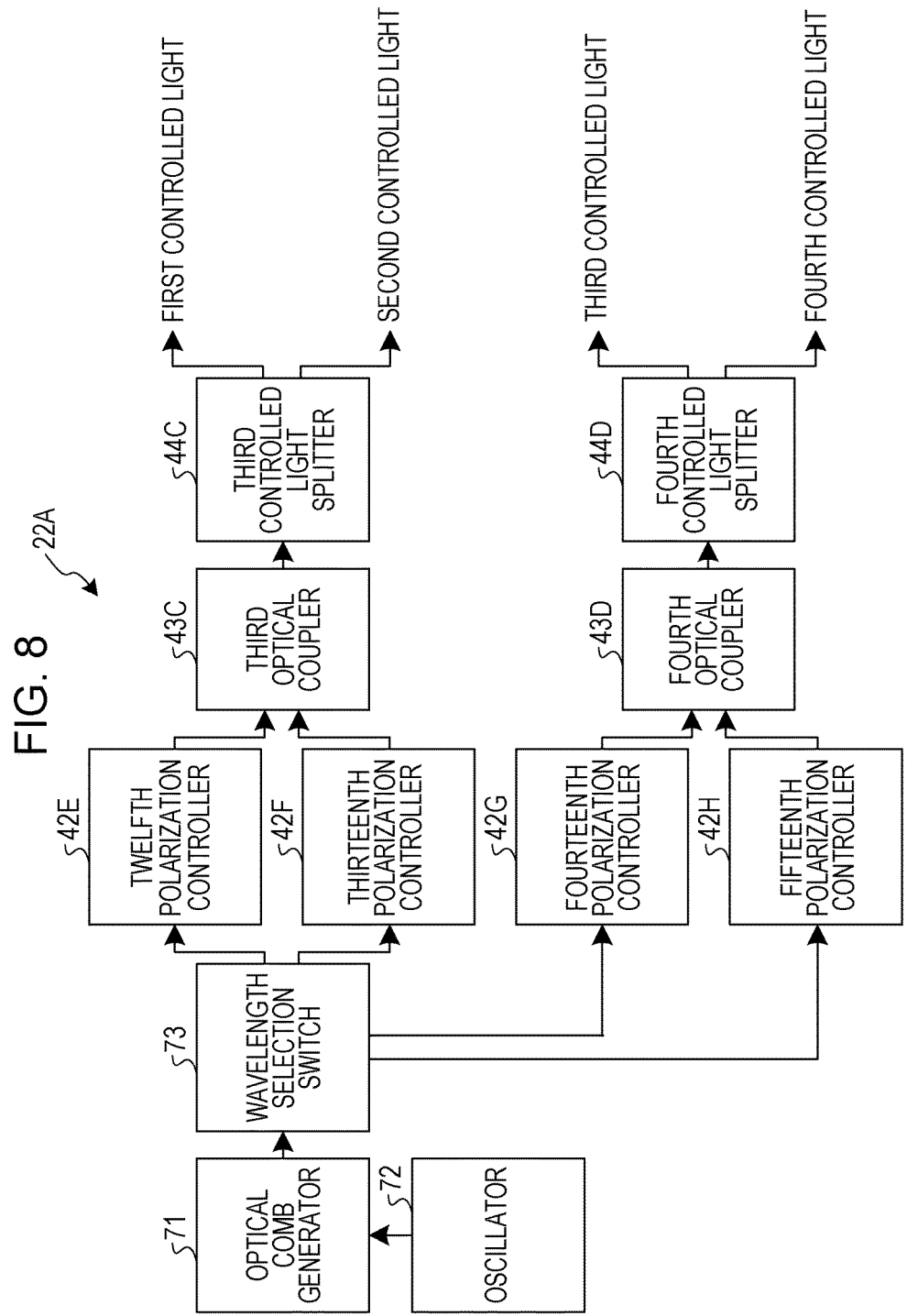
FIG. 8 is an explanatory diagram illustrating an example of a third generator in a fifth embodiment.

FIG. 8 is an explanatory diagram illustrating an example of a third generator 22A in a fifth embodiment. The third generator 22A illustrated in FIG. 8 includes an optical comb generator 71, an oscillator 72, and a wavelength selection switch 73. The third generator 22A has a twelfth polarization controller 42E, a thirteenth polarization controller 42F, a third optical coupler 43C, and a third controlled light splitter 44C. The third generator 22A includes a fourteenth polarization controller 42G, a fifteenth polarization controller 42H, a fourth optical coupler 43D, and a fourth controlled light splitter 44D.

The optical comb generator 71 generates multiple continuous waves at predetermined frequency spacing, according to an oscillation signal from the oscillator 72. The wavelength selection switch 73 selects the first continuous wave CW1 of the optical frequency v1, the second continuous wave CW2 of the optical frequency v2, the third continuous wave CW3 of the optical frequency v3, and the fourth continuous wave CW4 of the optical frequency v4 from the multiple continuous waves generated by the optical comb generator 71 and outputs the selected continuous waves.

Specifically, the wavelength selection switch 73 outputs the first continuous wave CW1 of the optical frequency v1 to the twelfth polarization controller 42E. The twelfth polarization controller 42E polarizes the first continuous wave CW1 to obtain the horizontally-polarized first controlled light and outputs the horizontally-polarized first controlled light to the third optical coupler 43C. The wavelength selection switch 73 outputs the second continuous wave CW2 of the optical frequency v2 to the thirteenth polarization controller 42F. The thirteenth polarization controller 42F polarizes the second continuous wave CW2 to obtain the vertically-polarized second controlled light orthogonal to the first controlled light and outputs the vertically-polarized second controlled light to the third optical coupler 43C. The third optical coupler 43C outputs a combined light obtained by combining the horizontally-polarized first controlled light and the vertically-polarized second controlled light, to the third controlled light splitter 44C. The third controlled light splitter 44C divides the combined light obtained by combining the first controlled light and the second controlled light into the first controlled light and the second controlled light, and outputs the divided controlled lights.

Moreover, the wavelength selection switch 73 outputs the third continuous wave CW3 of the optical frequency v3 to the fourteenth polarization controller 42G. The fourteenth polarization controller 42G polarizes the third continuous wave CW3 to obtain the vertically-polarized third controlled light and outputs the vertically-polarized third controlled light to the fourth optical coupler 43D. The wavelength selection switch 73 outputs the fourth continuous wave CW4 of the optical frequency v4 to the fifteenth polarization controller 42H. The fifteenth polarization controller 42H polarizes the fourth continuous wave CW4 to obtain the horizontally-polarized fourth controlled light orthogonal to the third controlled light and outputs the horizontally-polarized fourth controlled light to the fourth optical coupler 43D.

The fourth optical coupler 43D outputs a combined light obtained by combining the vertically-polarized third controlled light and the horizontally-polarized fourth controlled light, to the fourth controlled light splitter 44D. The fourth controlled light splitter 44D divides the combined light obtained by combining the vertically-polarized third controlled light and the horizontally-polarized fourth controlled light into the third controlled light and the fourth controlled light, and outputs the divided controlled lights.

Since the third generator 22A of the fifth embodiment uses the optical comb generator 71, the third generator 22A is capable of generating the first controlled light, the second controlled light, the third controlled light, and the fourth controlled light at high accuracy. As a result, it is possible to perform accurate frequency control in cross phase modulation using beat light up to several THz at optical frequency spacing of $\Delta v$. Hence, highly-accurate optical frequency shift may be achieved.

Sixth Embodiment

FIG. 9 is an experimental diagram illustrating an example of a third generator 22B in a sixth embodiment. Note that the same configurations as those in the third generator 22A of the fifth embodiment are denoted by the same reference numerals, and overlapping description of the configurations and the operations is omitted.

The third generator 22B illustrated in FIG. 9 is different from the third generator 22A in that a first optical filter 74A and a second optical filter 74B are disposed in a later stage of the third controlled light splitter 44C and that a third optical filter 74C and a fourth optical filter 74D are disposed in a later stage of the fourth controlled light splitter 44D.

The first optical filter 74A transmits and outputs the first controlled light optically divided by third controlled light splitter 44C. The second optical filter 74B transmits and outputs the second controlled light optically divided by the third controlled light splitter 44C. The third optical filter 74C transmits and outputs the third controlled light optically divided by the fourth controlled light splitter 44D. The fourth optical filter 74D transmits and outputs the fourth controlled light optically divided by the fourth controlled light splitter 44D. As a result, it is possible to improve the output accuracy of the first controlled light, the second controlled light, the third controlled light, and the fourth controlled light. In other words, it is possible to perform accurate frequency control in cross phase modulation using beat light up to several THz at optical frequency spacing of $\Delta v$. Hence, highly-accurate optical frequency shift may be achieved.

Note that, although description is given of the case where the optical frequency shift devices in the first to sixth embodiments are applied to, for example, the node 1 of the ROADM as illustrated in FIG. 1, the optical frequency shift devices may be applied to devices other than the node 1 of the ROADM. For example, the optical frequency shift devices may be applied to a wavelength division multiplex (WDM) device. An embodiment of this case is described below as a seventh embodiment.

Seventh Embodiment

FIG. 10 is an explanatory diagram illustrating an example of the WDM device in the seventh embodiment. The WDM device 80 illustrated in FIG. 10 includes the optical frequency shift device 4 (4A, 4B, 4C) and an optical combiner 81. For example, the optical combiner 81 receives optical signals a, b, and c of certain optical frequencies with predetermined frequency spacing of $\Delta v$. The optical frequency shift device 4 (4A, 4B, 4C) receives optical signals d, e, and f of certain optical frequencies with the predetermined frequency spacing of $\Delta v$ which are the same as those of the optical signals a, b, and c. The optical frequency shift device 4 (4A, 4B, 4C) shifts the optical frequencies of the optical signals d, e, and f and inputs the shifted optical signals d, e, and f into the optical combiner 81. This enables the optical combiner 81 to output the optical signals a, b, c, d, e, and f with frequency spacing of $\Delta v/2$.

The WDM device 80 is capable of outputting multiple optical signals by using the optical frequency shift device 4 (4A, 4B, 4C).

Note that the first optical coupler 43A, the second optical coupler 43B, the third optical coupler 43C, and the fourth optical coupler 43D may be, for example, polarization beam splitters or wavelength selection switches.

The constitutional elements of each of the illustrated parts do not have to be physically configured as illustrated. Specifically, specific modes of distribution and integration of the parts are not limited to those illustrated and all or some of the parts may be configured to be functionally or physically distributed or integrated into arbitrary units, depending on various loads, usage conditions, and the like.

Any of the various processing functions performed in the devices may be partially or entirely executed by a central processing unit (CPU) (or a microcomputer such as a micro processing unit (MPU) or a micro controller unit (MCU)). Moreover, any of the various processing functions may be partially or entirely executed by a program which executes analysis on a CPU (or a microcomputer such as an MPU or an MCU) or by hardware using wired logic, as a matter of course.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical frequency shift device configured to shift a first optical signal of a first optical frequency to a second optical signal of a second optical frequency, the optical frequency shift device comprising:
   a splitter configured to split the first optical signal to an optical signal of a first polarization and an optical signal of a second polarization orthogonal to the first polarization;
   a generator configured to generate a first controlled light of the first polarization, a second controlled light of the second polarization, a third controlled light of the second polarization, and a fourth controlled light of the first polarization, each of frequency differences between the first controlled light and the second controlled light and between the third controlled light and the fourth controlled light having a frequency spacing equal to a difference between the first optical frequency and the second optical frequency;
   a nonlinear optical medium in which an idler light of the second polarization is created by causing cross phase modulation of the optical signal of the first polarization, the first controlled light, and the second controlled light, and in which an idler light of the first polarization is created by causing cross phase modulation of the optical signal of the second polarization, the third controlled light, and the fourth controlled light; and
   an optical combiner configured to combine the idler light of the second polarization and the idler light of the first polarization so as to generate the second optical signal.

2. The optical frequency shift device according to claim 1, wherein the nonlinear optical medium includes:
   a first nonlinear optical medium in which the idler light of the second polarization is created by causing the cross phase modulation of the optical signal of the first polarization, the first controlled light, and the second controlled light; and
   a second nonlinear optical medium in which the idler light of the first polarization is created by causing the cross phase modulation of the optical signal of the second polarization, the third controlled light, and the fourth controlled light.

3. The optical frequency shift device according to claim 1, wherein the generator includes:
   a light source configured to generate a first continuous wave, a second continuous wave, a third continuous wave, and a fourth continuous wave; and
   a processor configured to polarize:
   the first continuous wave to generate the first controlled light,
   the second continuous wave to generate the second controlled light orthogonal to the first controlled light,
   the third continuous wave to generate the third controlled light, and
   the fourth continuous wave to generate the fourth controlled light orthogonal to the third controlled light.

4. The optical frequency shift device according to claim 1, wherein the generator includes:
   an optical comb generator configured to generate a plurality of continuous waves having predetermined frequency spacing according to an oscillation signal; and
   a processor configured to:
   select a first continuous wave, a second continuous wave, a third continuous wave, and a fourth continuous wave among the plurality of continuous waves generated by the optical comb generator,
   polarize:
   the first continuous wave to generate the first controlled light,
   the second continuous wave to generate the second controlled light orthogonal to the first controlled light,
   the third continuous wave to generate the third controlled light, and
   the fourth continuous wave to generate the fourth controlled light orthogonal to the third controlled light.

5. An optical frequency shift method of an optical frequency shift device configured to shift a first optical signal of a first optical frequency to a second optical signal of a second optical frequency, the optical frequency shift method comprising:
   splitting the first optical signal to an optical signal of a first polarization and an optical signal of a second polarization orthogonal to the first polarization;
   generating a first controlled light of the first polarization, a second controlled light of the second polarization, a third controlled light of the second polarization, and a fourth controlled light of the first polarization, each of frequency differences between the first controlled light and the second controlled light and between the third controlled light and the fourth controlled light having a frequency spacing equal to a difference between the first optical frequency and the second optical frequency;

creating an idler light of the second polarization in a nonlinear optical medium by causing cross phase modulation of the optical signal of the first polarization, the first controlled light, and the second controlled light;

creating idler light of the first polarization in the nonlinear optical medium by causing cross phase modulation of the optical signal of the second polarization, the third controlled light, and the fourth controlled light;

combining the idler light of the second polarization and the idler light of the first polarization so as to generate the second optical signal.

\* \* \* \* \*